United States Patent [19]

Yumuro et al.

[11] 4,083,281
[45] Apr. 11, 1978

[54] DEVICE FOR POSITIONING THE BACKWARD STROKE END OF SHEARING BLADE FOR USE IN BOLT FORMING HEADERS

[75] Inventors: Tazo Yumuro; Takashi Furuto, both of Komatsu, Japan

[73] Assignee: Kabushiki Kaisha Komatsu Seisakusho, Tokyo, Japan

[21] Appl. No.: 779,566

[22] Filed: Mar. 21, 1977

[30] Foreign Application Priority Data

Mar. 19, 1976 Japan .................................. 51-32223

[51] Int. Cl.$^2$ .......................... B26D 1/02; B26D 3/20
[52] U.S. Cl. ......................................... 83/525; 83/529;
83/530; 83/616; 83/628
[58] Field of Search .................. 83/525, 529, 530, 616, 83/628

[56] References Cited

U.S. PATENT DOCUMENTS 862,611  8/1907  Costello ................................. 83/530
3,174,377  3/1965  Lischer ................................. 83/525
4,036,089  7/1977  Criblez ............................. 83/628 X

*Primary Examiner*—Willie G. Abercrombie
*Attorney, Agent, or Firm*—Armstrong, Nikaido, Marmelstein & Kubovcik

[57] ABSTRACT

A device for positioning the backward stroke end of a shearing blade for use in a bolt forming header comprises a shearing slide reciprocably mounted within a box-shaped frame and having a shearing blade attached to the leading end thereof and a first abutment member fixedly secured to the rear end thereof, said abutment member having an inclined face formed in the rearmost end thereof, a stopper member movably mounted on the rear end portion of said frame and having an inclined face formed in the portion thereof opposite to the inclined face of said abutment member, and an adjusting mechanism mounted on said frame for moving said stopper member in the direction perpendicular to that of reciprocation of said shearing slide, thereby adjusting the backward stroke end of said shearing blade.

4 Claims, 3 Drawing Figures

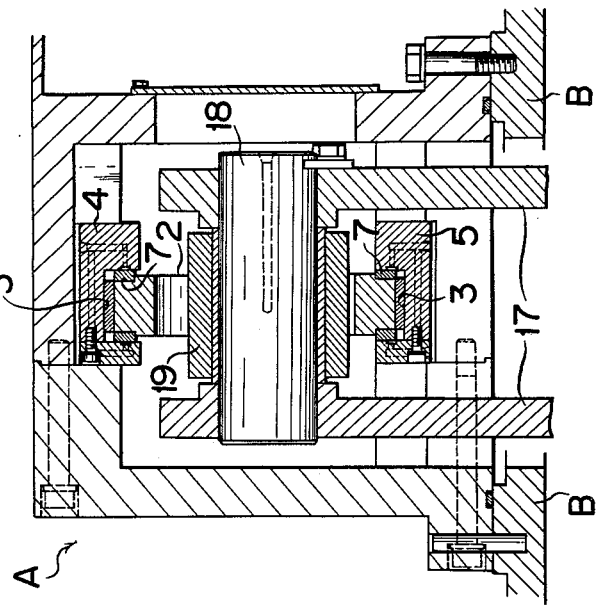
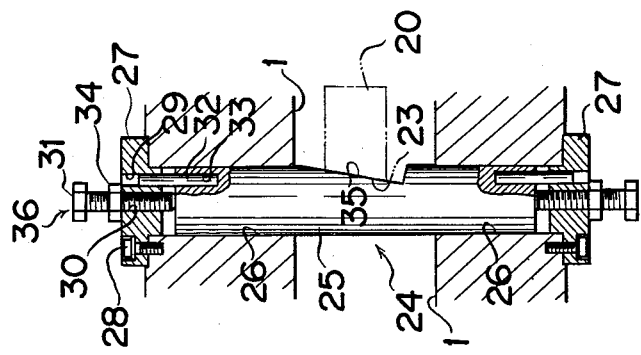

DEVICE FOR POSITIONING THE BACKWARD STROKE END OF SHEARING BLADE FOR USE IN BOLT FORMING HEADERS

BACKGROUND OF THE INVENTION

1. Field of the Invention

This invention relates to a bolt forming header for forming rod-shaped blanks into bolts, and more particularly to a device for positioning the backward stroke end of a shearing blade for use in a bolt forming header.

2. Description of the Prior Art

Heretofore, the forward and the backward stroke ends of a shearing blade employed in conventional devices of the kind specified have been determined by means of a cam mechanism only. Stating in brief, according to the United Kingdom Pat. No. 1,026,261, there has been disclosed an arrangement in which a shearing slide member or piece having a shearing blade mounted on the leading end thereof can be driven by the cooperation of cam plates and a lever adapted to be driven by the cam plates so that the forward and the backward stroke end of the shearing blade can be determined by the design of the cam plates. Furhter, the Japanese Utility Model Registration Publication No. 17162/64 discloses an arrangement in which a shearing slide member or piece having a shearing blade mounted on the leading end thereof is connected through a slider member to a cam plate having a groove formed therein so that the forward and the backward stroke end of the shearing blade can be determined by the design of the cam groove.

In the above-mentioned prior art devices, the respective sheared faces of sheared blanks become rough, because a sufficient shearing speed and shearing force can not be applied to the shearing blade. As a result, it is impossible to machine the sheared blank as it is so as to make it into a finished product.

SUMMARY OF THE INVENTION

The present invention has for its object to provide a device for positioning the backward stroke end of a shearing blade for use in a bolt forming header which is free from the above-mentioned disadvantage in the prior art devices.

Another object of the present invention is to provide a device for positioning the backward stroke end of a shearing blade for use in a bolt forming header, in which the shearing blade can be located at an optimum rear end position relative to a shearing station of the bolt forming header so that, when the shearing blade passes through the shearing station, a sufficient shearing speed and shearing force can be obtained, thereby enabling an accurate sheared face to be formed in the sheared blank so as to put the sheared blank to a desired subsequent machining step as it is.

A further object of the present invention is to provide a device for positioning the backward stroke end of a shearing blade for use in a bolt forming header having a mechanism which enables adjustment of the backward stroke end of the shearing blade.

According to a first aspect of the present invention for achieving the aforesaid objects, there is provided a device for positioning the backward stroke end of a shearing blade for use in a bolt forming header, comprising a box-shaped frame fixedly mounted on a header body, a shearing slide reciprocably supported within the frame and having a shearing blade attached to its leading end and also having a rectangular opening formed in its rear end portion, a first abutment member fixedly secured to the rear end of the shearing slide, a stopper member mounted on the rear end portion of the frame and extending substantially perpendicular to the direction of reciprocation of the shearing slide, a second abutment member fixedly secured to the forward side face of the rectangular opening of the shearing blade, an hydraulically or pneumatically actuated piston-cylinder arrangement fixedly secured to the rear end face of the shearing slide, the piston of said piston-cylinder arrangement being connected to a piston rod which is extensible into the rectangular opening of the shearing slide when the piston is reciprocated, an hydraulic or pneumatic fluid supply conduit connected between the piston-cylinder arrangement and a pressurized fluid supply source, a block member movably mounted within the rectangular opening of the shearing slide, the block member being confined between the piston rod of the piston-cylinder arrangement and the second abutment member and being adapted to be urged against the second abutment member by the movement of said piston rod, a shearing slide actuating lever pivotally connected through a pivot pin to the block member and adapted to be oscillated by a cam mechanism driven by a driving gear in the bolt forming header, wherein when the shearing slide is back towards the backward stroke end thereof, the shearing slide actuating lever is moved backwards further until the block member is permitted to abut against the rear side face of the rectangular opening of the shearing slide opposite to the second abutment member so that a clearance or space can be made between the block member and the said second abutment member, thereby enabling a sufficient advancing speed, which is transmitted through the block member and the second abutment member to the shearing slide, to be applied to the shearing slide actuating lever while the lever is forwardly moved in the clearance or space.

According to a second aspect of the present invention, both abutting faces of the first abutment member and the stopper member are inclined relative to the direction perpendicular to that of reciprocation of the shearing slide, said abutting faces being formed in a complementary shape.

According to a third aspect of the present invention, there is provided further a mechanism for adjusting the position of the abutting face of the stopper member, the adjusting mechanism comprising a pair of retainers each being fixedly secured to each side of the frame at a position opposite to each end face of the stopper member and having a screw threaded hole extending in the direction substantially perpendicular to the end face of the stopper member, a pair of adjusting bolts each being adapted to be threadably inserted into the screw threaded hole of the retainer in a manner such that the leading end thereof can be brought into contact with the end face of the stopper member, and a pair of lock nuts each being adapted to be threadably engaged with the adjusting bolt.

According to a fourth aspect of the present invention, there is provided still further an arrangement for preventing the stopper member from turning around the longitudinal axis thereof.

BRIEF DESCRIPTION OF THE DRAWINGS

The above and other objects, features and advantages of the present invention will become more apparent from the following description taken in conjunction with the accompanying drawings in which:

FIG. 2 is a vertical sectional view of the device taken along line II—II in FIG. 1; and FIG. 3 is a frangemental sectional view of the device taken along line III—III in FIG. I.

DETAILED DESCRIPTION OF THE PREFERRED EMBODIMENTS

Figure 1:
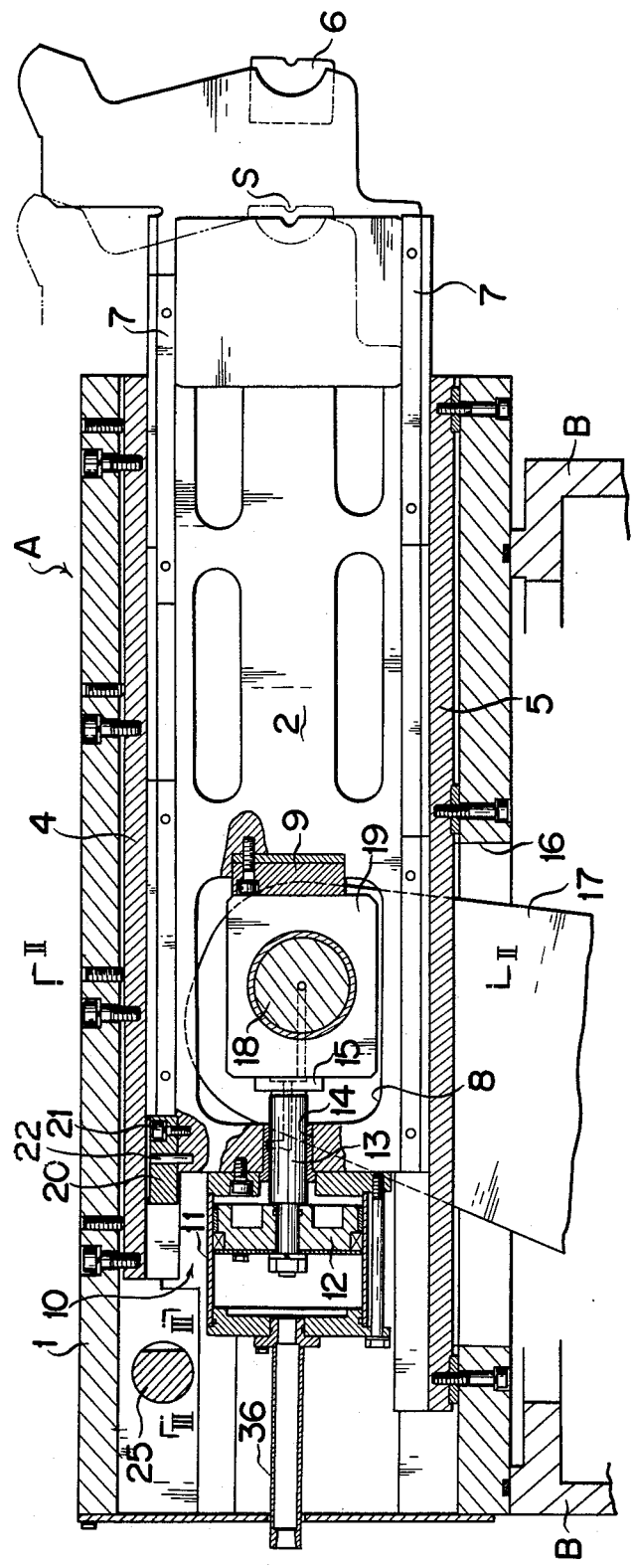
FIG. 1 is a partially vertical sectional side view of the overall device of the present invention.

The present invention will now be described in detail below with reference to the accompanying drawings.

A device "A" for shearing rod-shaped blanks in a bolt forming header is fixedly mounted through a box-shaped frame 1 on a header body "B".

The shearing device "A" is provided with a shearing slide 2 adapted to reciprocate within a frame 1. Fixedly secured to the inside of upper and lower surfaces of the frame 1 are guide members 4 and 5 each having a slide groove 3 formed therein. Slide members 7 secured to the upper and lower edge portions of the shearing slide 2 are slidably fitted or inserted in the slide grooves 3 of the guide members 4 and 5. The shearing slide 2 has a shearing blade 6 fixedly secured to the leading end thereof. The shearing slide 2 has further a rectangular opening 8 formed in the rear end portion thereof. The rectangular opening has a second abutment member 9 fixedly secured to the forward side face thereof.

The shearing slide 2 has a cylinder-piston arrangement 10 fixedly secured to the rear end face thereof. The piston-cylinder arrangement 10 includes a cylinder 11 fixedly secured to the rear end face of the shearing slide 2. The cylinder 11 accommodates a pneumatic or hydraulic pressure actuated piston 12 slidably fitted therein. The piston 12 has a piston rod 13 connected thereto which passes through a hole 14 formed in the rear end portion of the shearing slide 2 into the rectangular opening 8. To the leading end of the rod 13, a shearing slide retaining thrust member 15 is attached.

The frame 1 has holes 16 formed in the lower face thereof. The respective leading ends of a pair of shearing slide actuating levers 17, 17 are inserted through the holes 16 into the frame 1. The pair of shearing slide actuating levers 17, 17 have a pivot pin 18 on which is pivotally mounted a block member 19. The block member 19 is located within the rectangular opening 8 and is urged lightly against a second abutment member 9 through the thrust member 15 of the above-mentioned piston-cylinder arrangement 10 by the action of pneumatic or hydraulic pressure.

A first abutment member 20 is fixedly secured to the rear end of the shearing slide 2 by means of a bolt 21 and a cock pin 22. The first abutment member 20 has an inclined face 23 formed in the rear end face thereof.

A stopper arrangement 24 is provided in the rear end portion of the frame 1. The stopper arrangement 24 comprises a stopper member 25 extending substantially perpendicular to the direction of reciprocation of the shearing slide 2. Both ends of the stopper member 25 are inserted in holes 26 formed in the frame 1 in the lateral direction thereof. Fixedly secured to the respective outer ends of the holes 26 are retainers 27 which are fixedly secured to the frame 1 by means of bolts 28, respectively. Each of the retainers 27 has a screw threaded hole 30 with which an adjusting bolt 31 is threadably engaged.

The leading end of each of the adjusting bolts 31 is brought into contact with either of the end faces of the stopper member 25. Each of the adjusting bolts 31 has a lock nut 34 threadably engaged therewith. The stopper member 25 has an inclined face 35 formed in a shape such as corresponding to the inclined rear end face 23 of the first abutment member 20. The retainer 27, the adjusting bolt 31 and a lock pin 32 form an adjusting unit or arrangement 36.

Further, the above-mentioned stopper member 25 has an arrangement for preventing it from turning around its longitudinal axis. For example, in an embodiment shown in FIG. 3, the stopper member 25 and the retainer 27 have axially extending holes 33 and 29 perforated therethrough, respectively. A pin 32 is press-fitted within the holes 33 and 29. As an alternative, a combination of a key-way and a key member may be used between the stopper member 25 and the frame 1.

Connected to the rear end portion of the piston-cylinder arrangement 10 is a pneumatic or hydraulic fluid supply pipe 36 which is connected to a pneumatic or hydraulic fluid supply source. Pneumatic or hydraulic fluid under pressure is supplied into the cylinder 11 so as to urge through the piston 12 and the rod 13 against the thrust member 15.

The operation of the device will now be described hereinbelow.

When the shearing blade actuating lever 17 is driven by a cam mechanism (not shown), the block member 19 urges against the second abutment member 9 to move the shearing slide 2 forwards so that the shearing blade 6 fixedly secured to the shearing slide can shear a rod-shaped blank by its shearing action. The rod-shaped blank is fed to a shearing station "S" in front of the shearing blade 6 by a blank feeding mechanism (not shown).

Even when the above-mentioned shearing blade actuating lever 17 has been moved backwards and the shearing slide 2 has been stopped by the stopper arrangement 24, the block member 19 will move further backwards so that the piston 12 is moved backwards towards the rear end portion of the frame 1 through the thrust member 15 and the rod 13. As a result, the presurized fluid within the cylinder 11 is compressed so that a clearance or space is made between the block member 19 and the second abutment member 9. In brief, as the shearing slide 2 approaches its original position, the first abutment member 20 secured to the rear end portion of the shearing slide 2 will abut against the stopper member 25 so that the movement of the shearing slide 2 can be stopped. Whilst, the shearing blade actuating lever 17 will move back further by the action of a cam mechanism (not shown) so that the piston 12 can be moved backwards, thereby creating the aforementioned clearance or space between the block member 19 and the second abutment member 9. After that, while the block member 19 is moved again forwards through the clearance or space, the shearing blade actuating lever 17 is given a sufficient advancing or travelling speed.

The position of the backward stroke end of the shearing slide 2 can be adjusted by moving the stopper member 25 by means of the adjusting bolts 31 so that the shearing blade 6 mounted on the leading end of the shearing slide 2 can be located at an optimum position relative to the shearing station "S", thereby determining the relative positions of the inclined face 35 of the stopper member 25 and the inclined face 23 of the first abutment member 20.

It is to be understood that the foregoing description is merely illustrative of the preferred embodiments of the present invention and that the scope of the invention is not to be limited thereto, but is to be determined by the scope of the appended claims.

What is claimed is:

1. A device for positioning the backward stroke end of a shearing blade for use in a bolt forming header, comprising a box-shaped frame fixedly mounted on a header body, a shearing slide reciprocably supported within said frame and having a shearing blade attached to its leading end and also having a rectangular opening formed in its rear end portion, a first abutment member fixedly secured to the rear end of said shearing slide, a stopper member mounted on the rear end portion of said frame and extending substantially perpendicular to the direction of reciprocation of said shearing slide, a second abutment member fixedly secured to the forward side face of said rectangular opening of said shearing slide, a hydraulically or pneumatically actuated piston-cylinder arrangement fixedly secured to the rear end of said shearing slide, the piston of said piston-cylinder arrangement being connected to a piston rod which is extensible into the rectangular opening of the shearing slide when said piston is reciprocated, a hydraulic or pneumatic fluid supplying conduit connected between said piston-cylinder arrangement and a pressurized fluid supply source, a block member movably mounted within the rectangular opening of said shearing slide, said block member being confined between the piston rod of said piston-cylinder arrangement and the second abutment member and being adapted to be urged against said second abutment member by the movement of said piston rod, a shearing slide actuating lever pivotally connected through a pivot pin to said block member and adapted to be oscillated by a cam mechanism driven by a driving gear in the bolt forming header, wherein when said shearing slide is moved back towards the backward stroke end thereof, said shearing slide actuating lever is moved backwards further until said block member is permitted to abut against the rear said face of the rectangular opening of said shearing slide opposite to said second abutment member so that a clearance or space can be made between said block member and said second abutment member, thereby enabling a sufficient advancing speed, which is transmitted through the block member and the second abutment member to the shearing slide, to be applied to the shearing slide actuating lever while said lever is forwardly moved in said clearance or space.

2. A device as claimed in claim 1, wherein both abutting faces of the first abutment member and the stopper member are inclined relative to the direction perpendicular to that of reciprocation of the shearing slide, said abutting faces being formed in a complementary shape.

3. A device as claimed in claim 2, further comprising a mechanism for adjusting the position of the abutting face of the stopper member, said adjusting mechanism comprising a pair of retainers each being fixedly secured to each side of the frame at a position opposite to each end face of the stopper member and having a screw threaded hole extending in the direction substantially perpendicular to the end face of said stopper member, a pair of adjusting bolts each adapted to be threadably inserted into the screw threaded holes of the retainer in such a manner that the leading end thereof can be brought into contact with the end face of said stopper member, and a pair of lock nuts each being adapted to be threadably engaged with the adjusting bolt.

4. A device as claimed in claim 3, further comprising means for preventing the stopper member from turning around the longitudinal axis thereof.

* * * * *